J. FREDRICKSON & F. A. RISBERG.
SAMPLE MOUNTING MACHINE.
APPLICATION FILED MAR. 17, 1915.

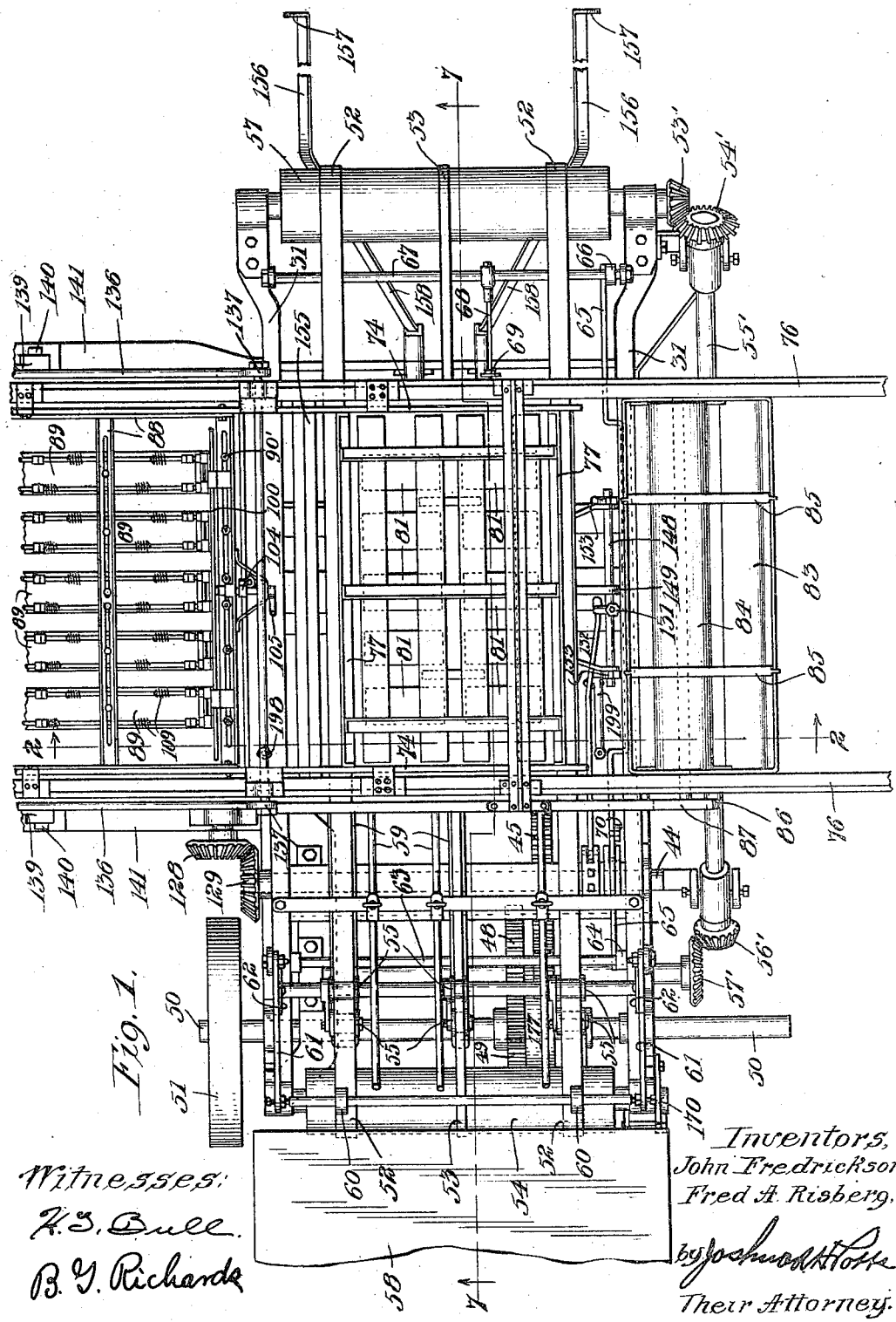

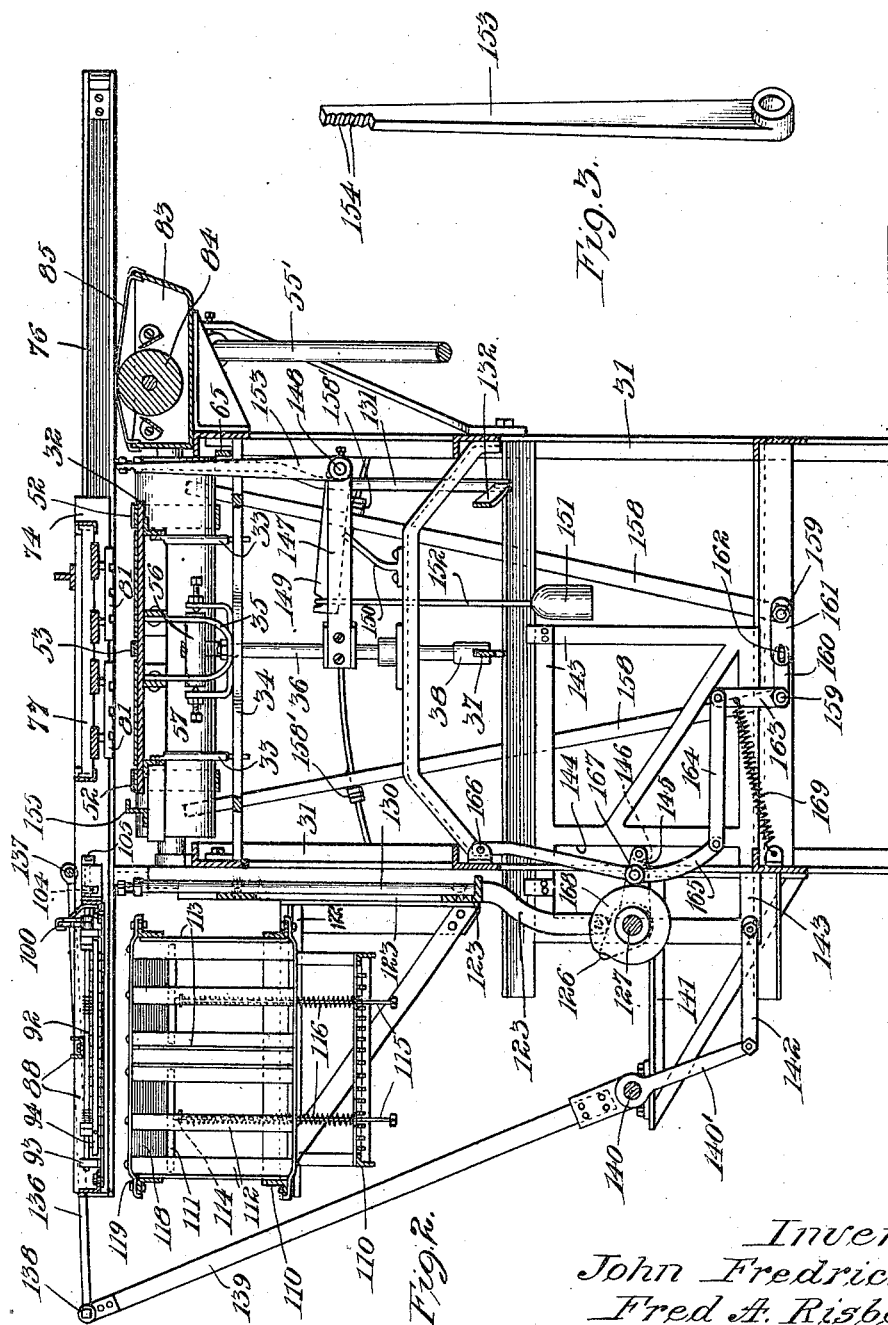

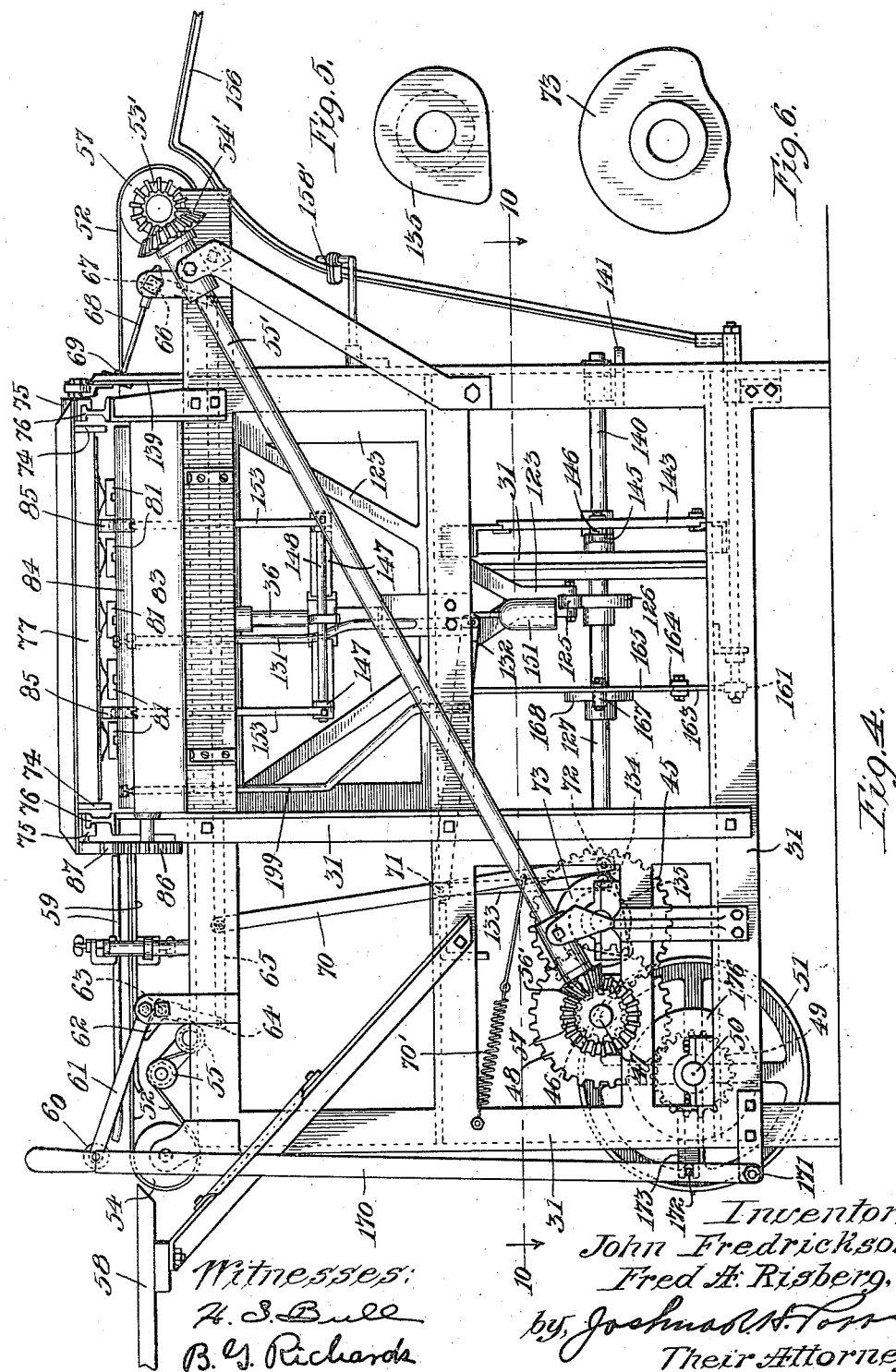

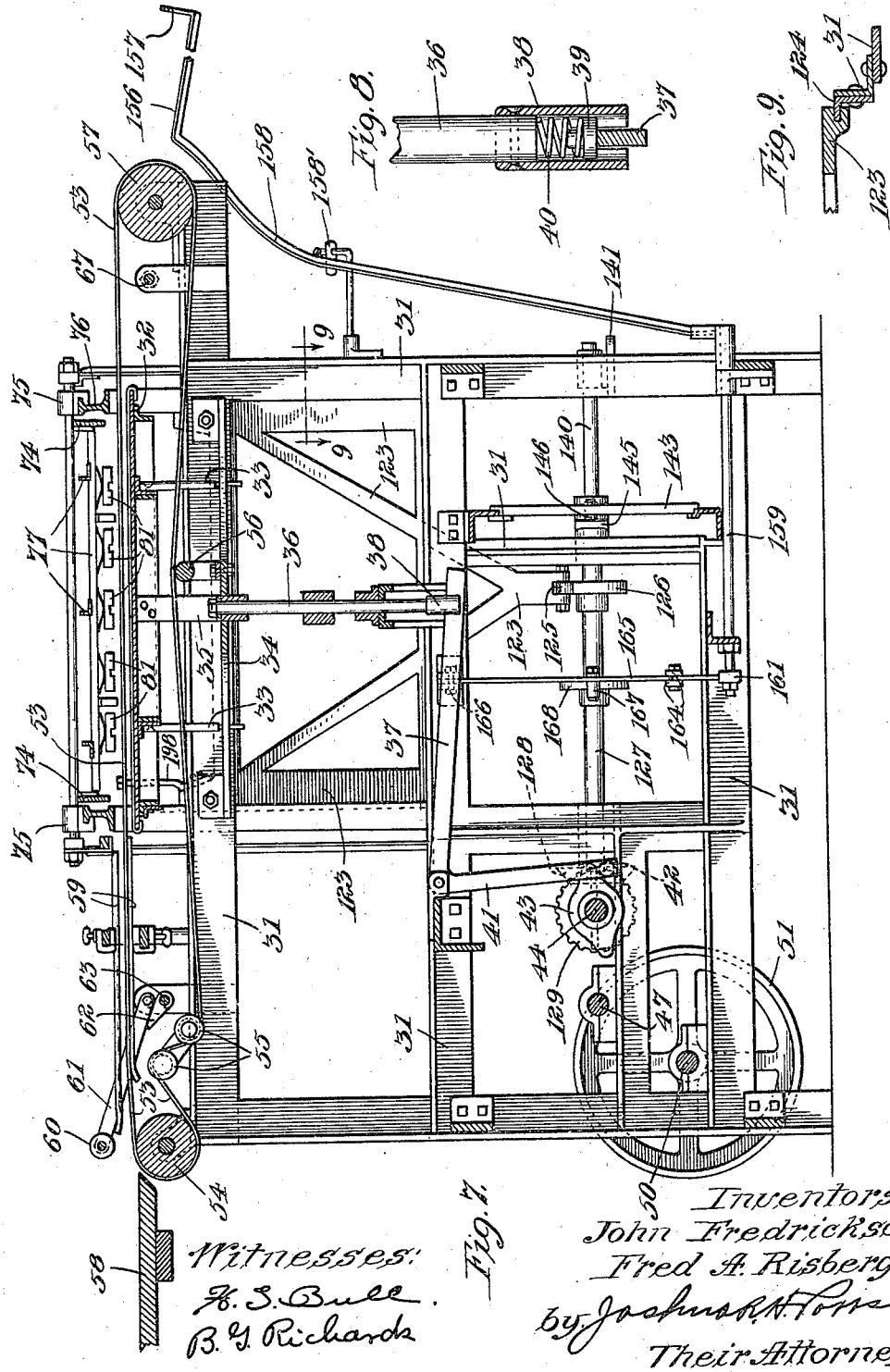

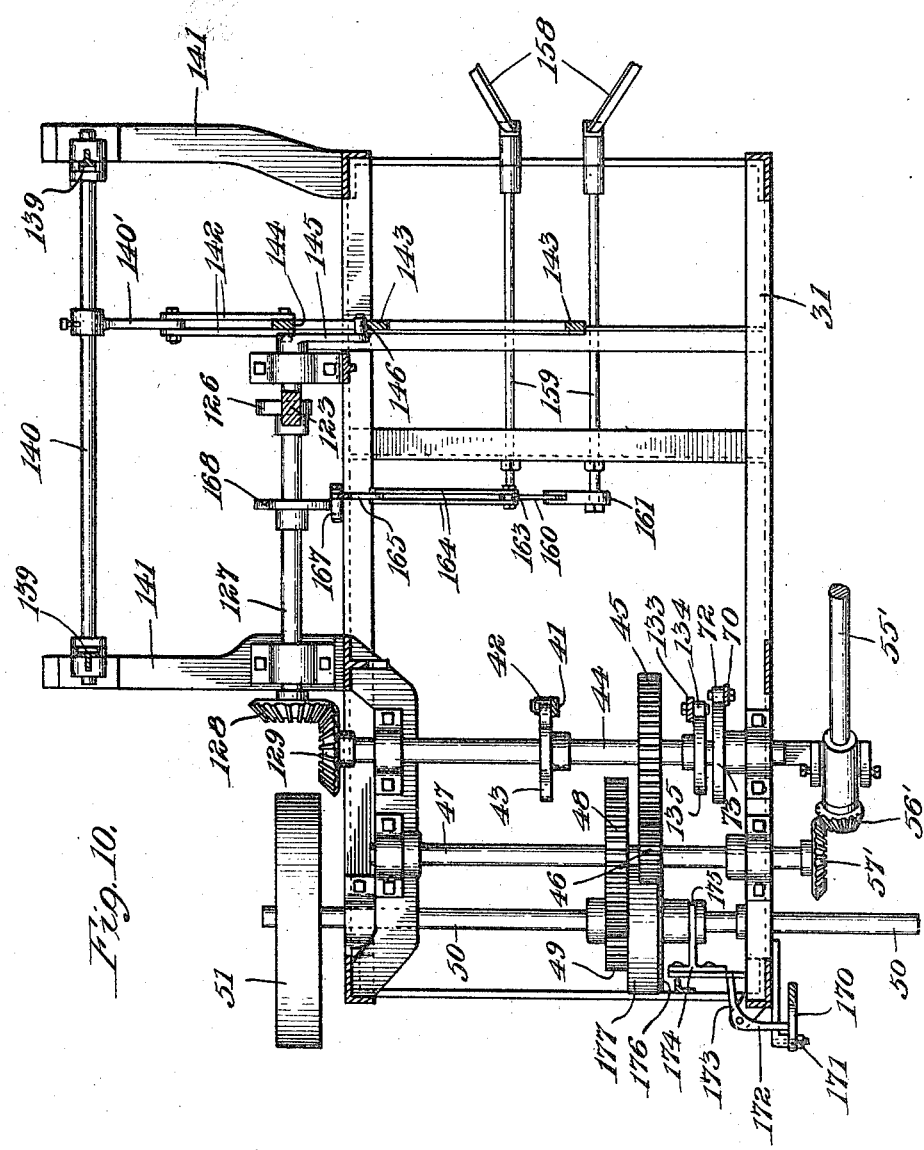

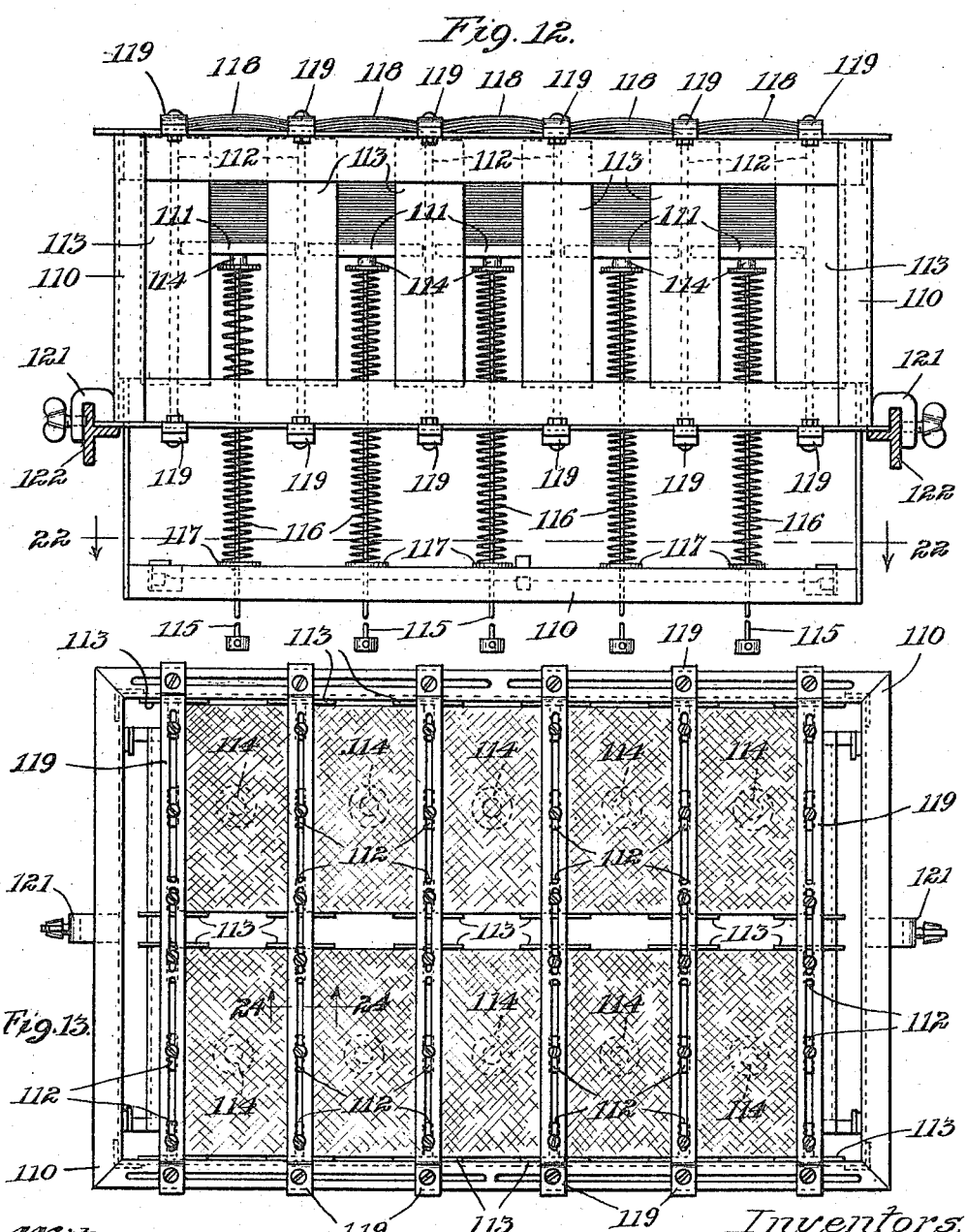

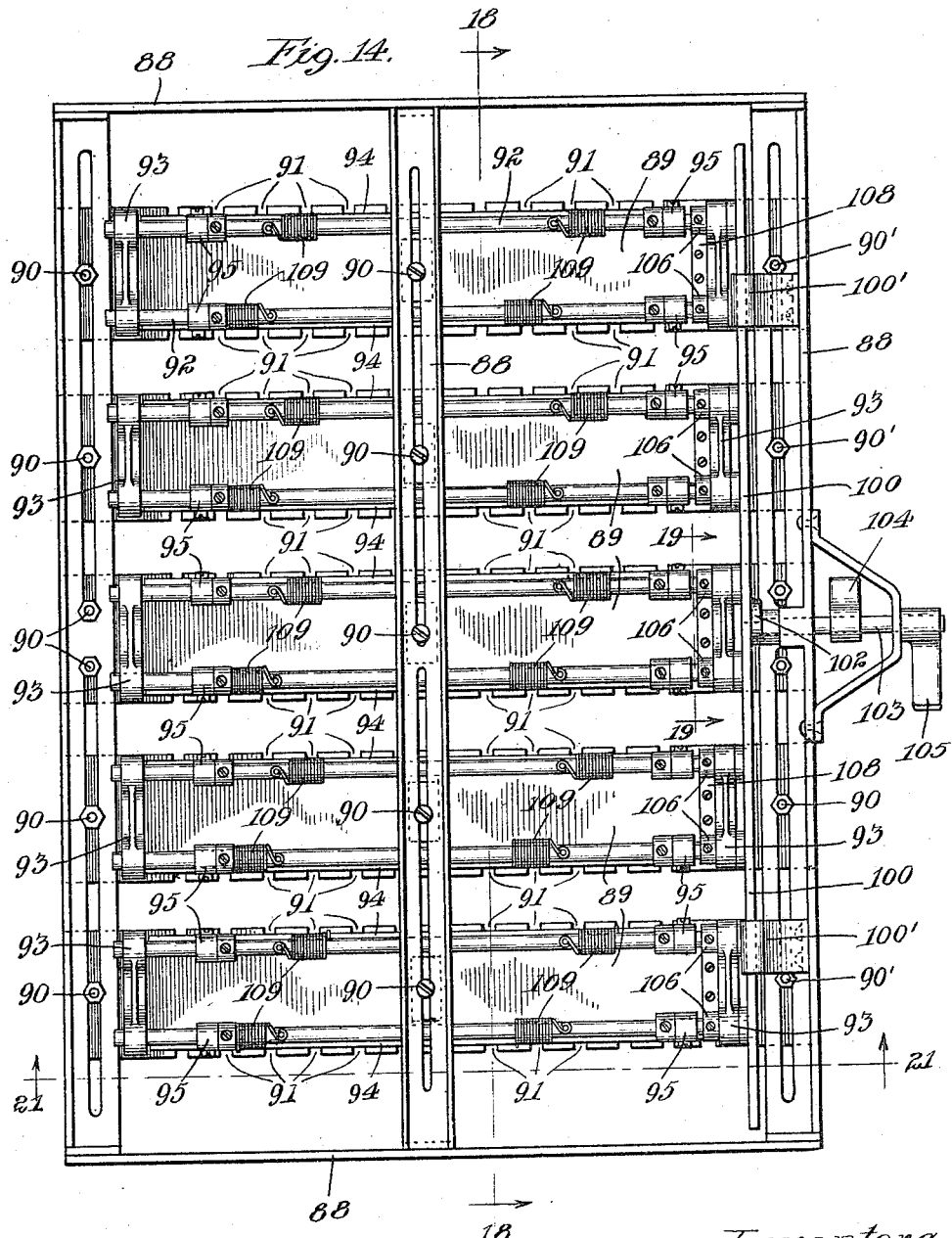

1,268,955.

Patented June 11, 1918.
13 SHEETS—SHEET 9.

Witnesses:
H. S. Bull
B. G. Richards

Inventors,
John Fredrickson,
Fred A. Risberg,
by Joshua R. H. Potts
Their Attorneys.

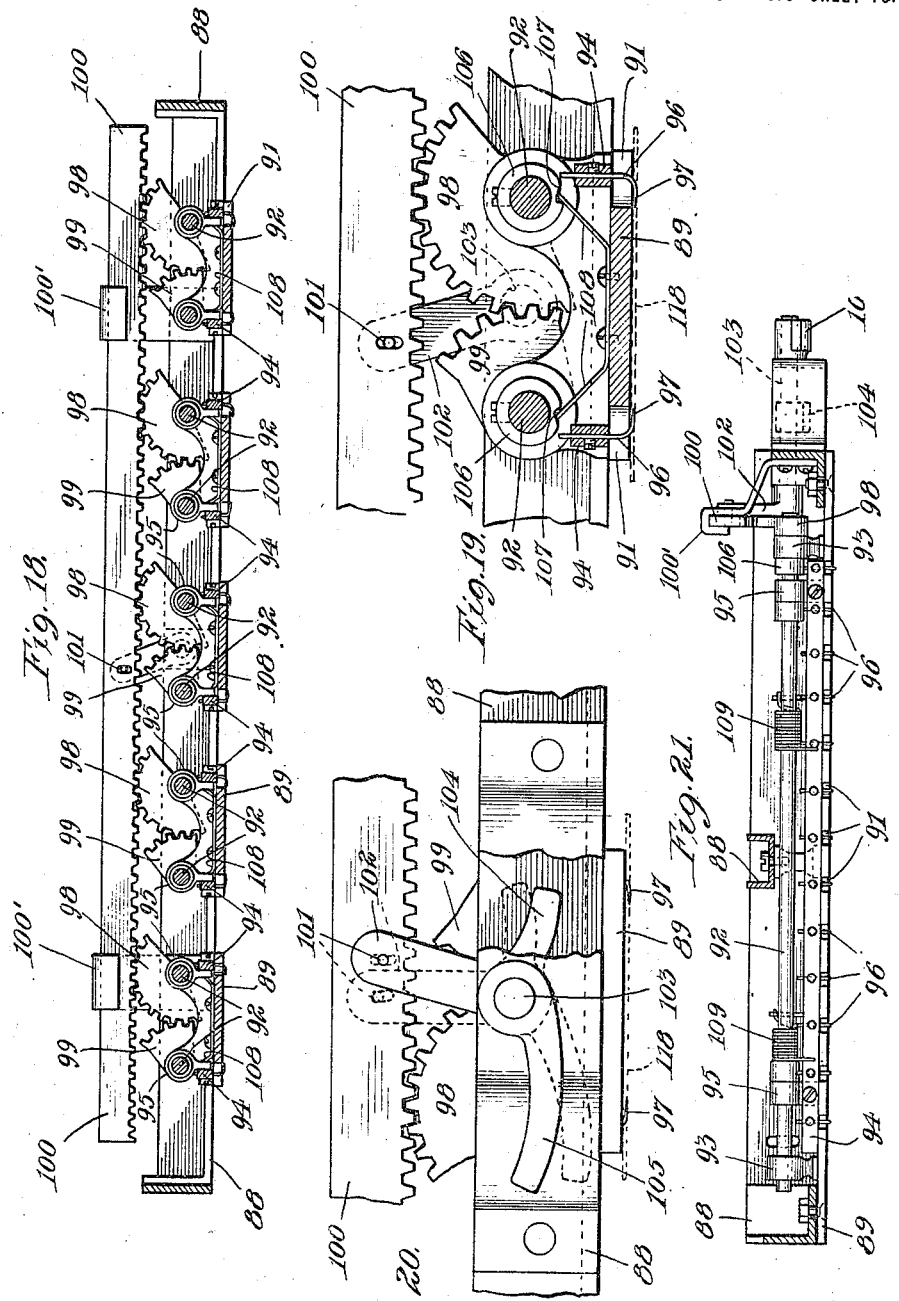

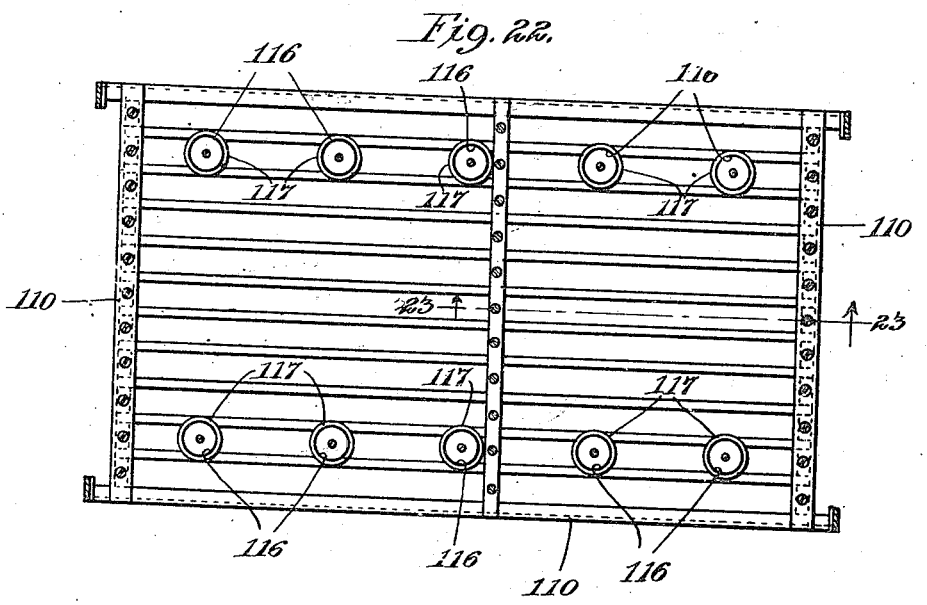
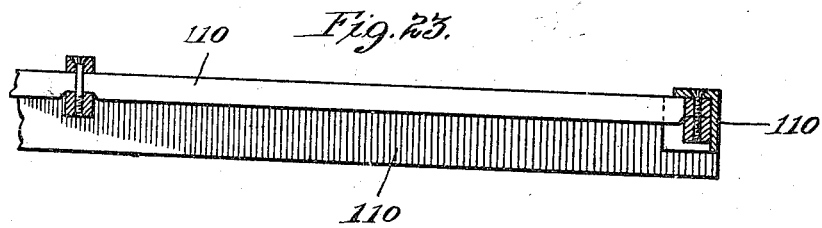
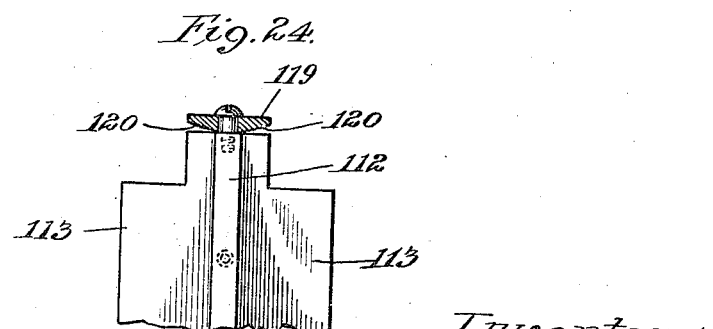

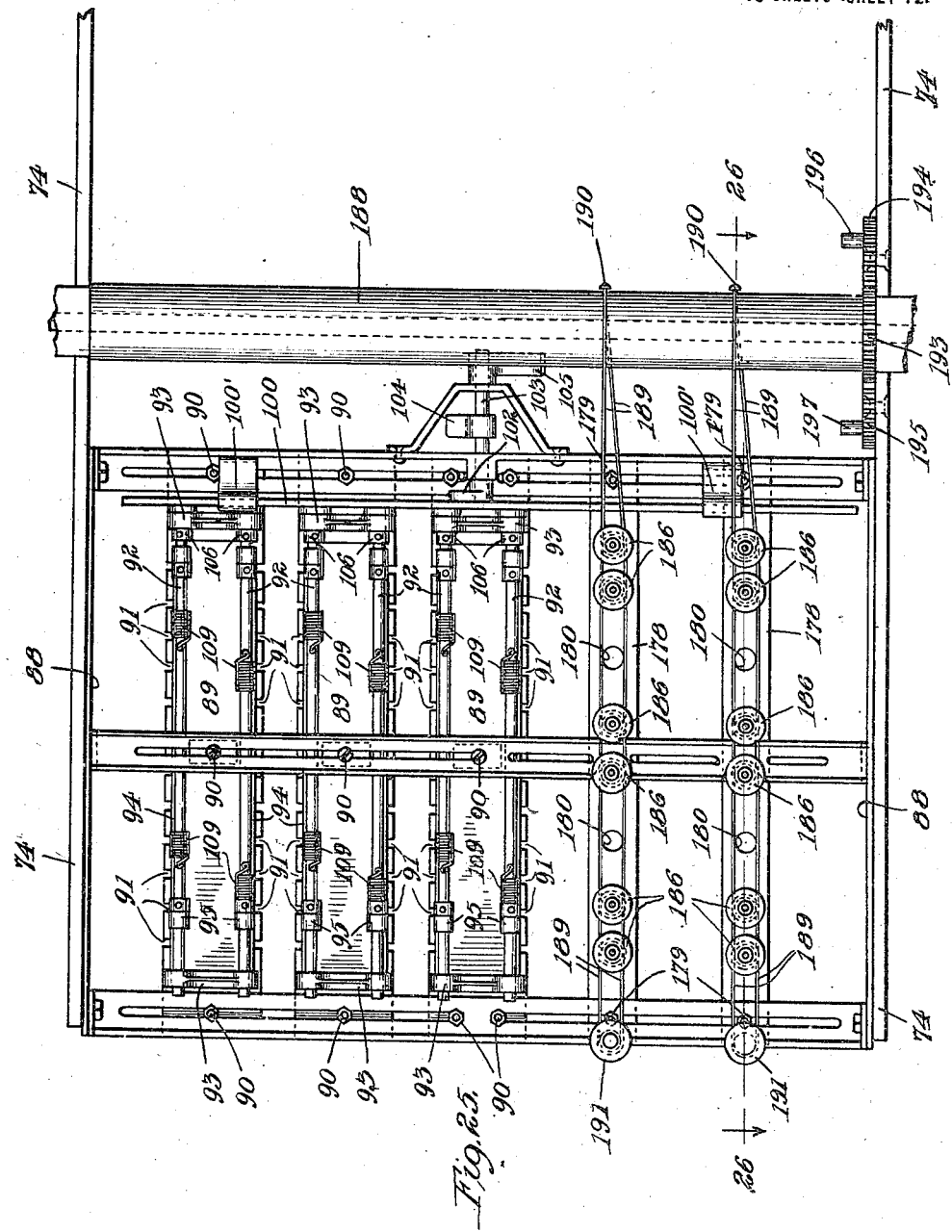

J. FREDRICKSON & F. A. RISBERG.
SAMPLE MOUNTING MACHINE.
APPLICATION FILED MAR. 17, 1915.
1,268,955.
Patented June 11, 1918.
13 SHEETS—SHEET 13.
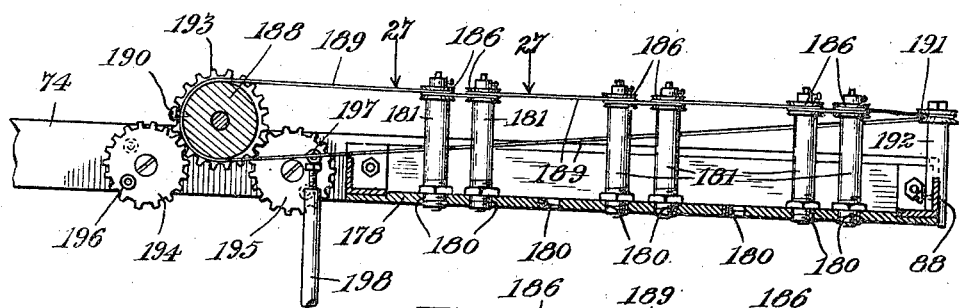
Fig. 26.
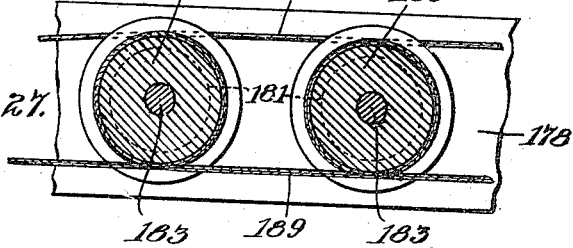
Fig. 27.
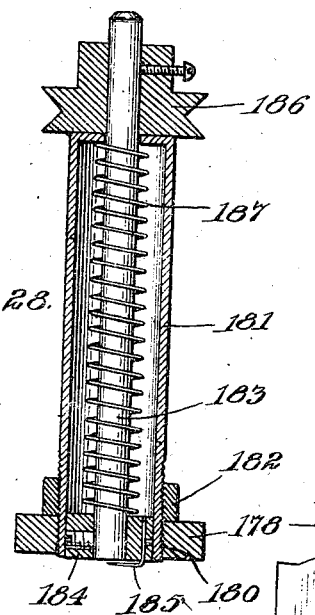
Fig. 28.
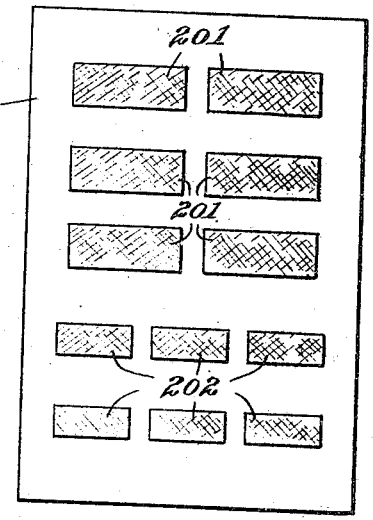
Fig. 30.
Fig. 29.
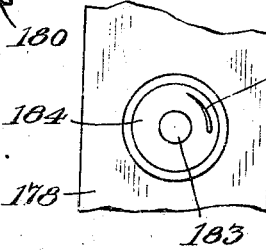
Witnesses:
H. J. Buie
B. G. Richards
Inventors,
John Fredrickson,
Fred A. Risberg,
by Joshua R. H. Potts
Their Attorney,

UNITED STATES PATENT OFFICE.

JOHN FREDRICKSON AND FRED A. RISBERG, OF CHICAGO, ILLINOIS.

SAMPLE-MOUNTING MACHINE.

1,268,955.     Specification of Letters Patent.     Patented June 11, 1918.

Application filed March 17, 1915. Serial No. 15,108.

*To all whom it may concern:*

Be it known that we, JOHN FREDRICKSON and FRED A. RISBERG, citizens of the United States, and residents of the city of Chicago, county of Cook, and State of Illinois, have invented a certain new and useful Sample-Mounting Machine, of which the following is a specification.

Our invention relates to improvements in sample mounting machines, and has for its object the provision of a machine of this character especially adapted for mounting samples of cloth on cards for exhibition and sale purposes, which is simple in operation and efficient in use.

The invention consists in the combinations and arrangements of parts hereinafter described and claimed.

Figure 11:
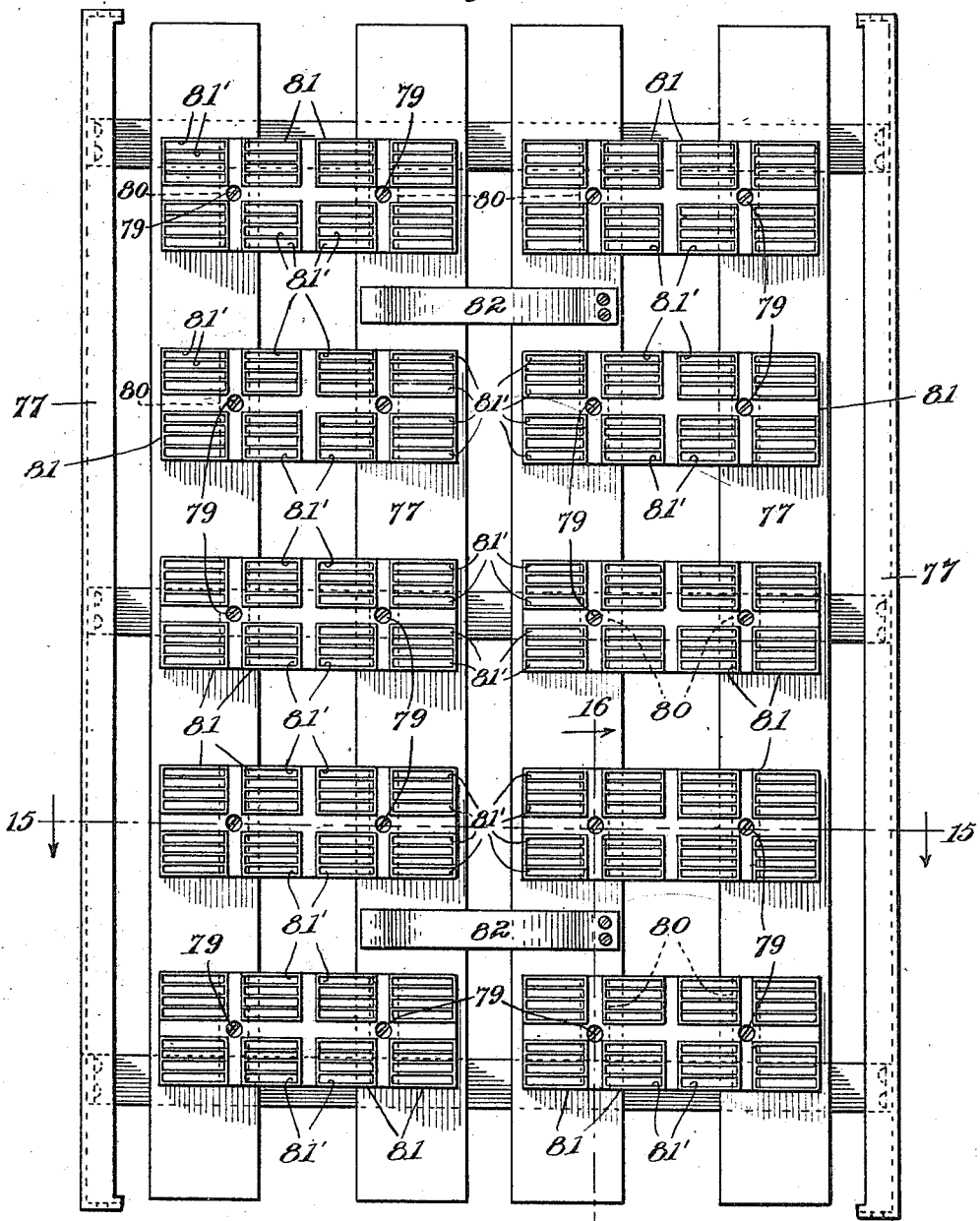
Figure 15:
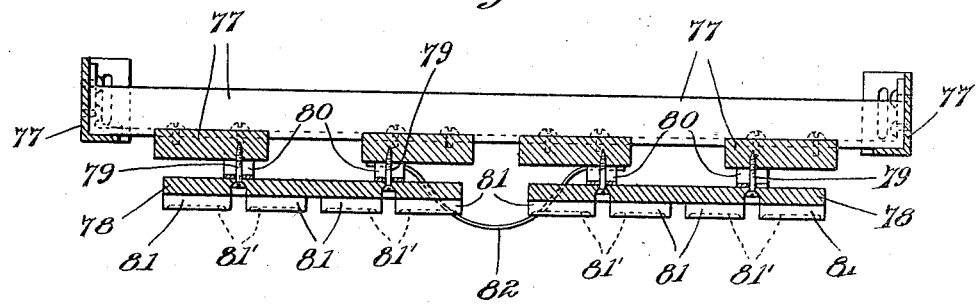
Figure 16:
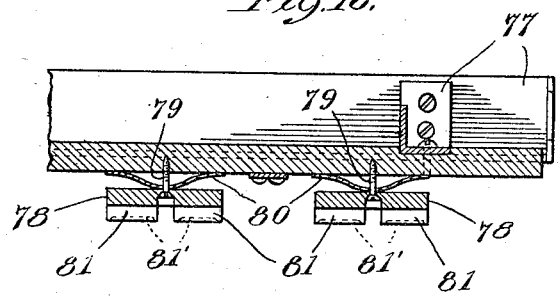
Figure 17:
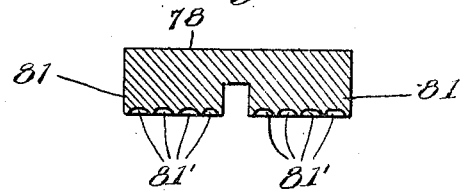

The invention will be best understood by reference to the accompanying drawings forming a part of this specification, and in which, Figure 1 is a top plan view of the central portion of a machine embodying our invention, Fig. 2, a longitudinal section of said machine taken substantially on line 2—2 of Fig. 1, Fig. 3, an enlarged perspective view of a card positioning and holding arm employed in the machine, Fig. 4, a side elevation of the machine, Fig. 5, a detail view of a cam employed in the machine, Fig. 6, a detail view of another cam employed in the machine, Fig. 7, a section taken on substantially line 7—7 of Fig. 1, Fig. 8, an enlarged detail view of a cushioned connection employed in the machine, Fig. 9, an enlarged section taken on line 9—9 of Fig. 7, Fig. 10, a horizontal section taken on substantially line 10—10 of Fig. 4, Fig. 11, an enlarged bottom plan view of a gluing frame employed in the construction, Fig. 12, an enlarged side elevation of a sample holder employed in the construction, Fig. 13, a top plan view corresponding with Fig. 12, Fig. 14, an enlarged top plan view of a sample carrier employed in the construction, Fig. 15, a section taken on line 15—15 of Fig. 11, Fig. 16, a section taken on line 16—16 of Fig. 11, Fig. 17, an enlarged transverse section of one of a plurality of gluing blocks employed in the construction, Fig. 18, a section of the sample carrier taken on line 18—18 of Fig. 14, Fig. 19, an enlarged section taken on line 19—19 of Fig. 14, Fig. 20, an enlarged view of the same parts illustrated in Fig. 19 but looking at them from the opposite direction, Fig. 21, a section taken on line 21—21 of Fig. 14, Fig. 22, a section taken on line 22—22 of Fig. 12, Fig. 23, an enlarged section taken on line 23—23 of Fig. 22, Fig. 24, an enlarged section taken on line 24—24 of Fig. 13, Fig. 25, a top plan view illustrating a modified form of sample carrier, Fig. 26, a section taken on line 26—26 of Fig. 25, Fig. 27, an enlarged section taken on line 27—27 of Fig. 26, Fig. 28, an enlarged detail view of one of the sample engaging members employed in the construction illustrated in Fig. 26, Fig. 29, a bottom plan view corresponding to Fig. 28, and Fig. 30, a plan view of a sample card supplied with samples by the modified form of construction illustrated in Figs. 25 to 29, inclusive.

The preferred form of construction, as illustrated in the drawings comprises a supporting frame 31 of any suitable or desired construction and having a vertically reciprocating table 32 positioned substantially centrally therein. Table 32 is guided upon suitable guide stems 33 sliding vertically in a cross member 34 in frame 31, as best shown in Figs. 2 and 7. The table 32 is carried by a bracket 35 secured to the upper end of a vertically reciprocating rod 36 riding at its lower end upon one arm 37 of a bell crank lever, as best illustrated in Figs. 2 and 7. At its lower end, rod 36 carries a hollow housing 38 notched for the passage of bell crank arm 37 and carrying a bearing plunger 39 pressing against a compression spring 40 so as to effect a cushioned connection between the carriage 32 and the bell crank lever arm 37. The other arm 41 of said bell crank carries a roller 42 running upon the periphery of a cam 43 secured on a countershaft 44 mounted in the frame of the machine, as best illustrated in Figs. 7 and 10. The shaft 44 is driven by means of a gear 45 meshing with a pinion 46 on another counter-shaft 47 which in turn carries a gear 48 meshing with a pinion 49 on the main driving shaft 50 of the machine, said driving shaft being equipped with a driving pulley 51, as will be readily understood. By this arrangement, it will be observed that upon rotation of shaft 50 and consequent rotation of shaft 44, the table 32 will be caused to make two vertical reciprocations for each rotation of shaft 44.

Feed belts 52 and 53 are arranged in the frame of the machine to travel across and above table 32 to conduct sample cards thereto, as best illustrated in Figs. 2, 4 and 7, these belts travel over suitable guide pulleys 54, 55, and 56 being driven by a drum 57, as indicated. Drum 57 is driven by a bevel gear 53' meshing with a bevel gear 54' on the upper end of an inclined shaft 55', the lower end of shaft 55' carrying a bevel gear 56' meshing with a bevel gear 57' on shaft 47. A feed table 58 is provided for convenience in feeding cards to said belts and suitable guide fingers 59 are provided to facilitate such feeding. A traction and guide roller 60 is mounted between swinging arms 61 in position to contact with a card entering guide fingers 59 and serving to cause friction or traction between said card and the belts, and also to serve as a guide to facilitate the introduction of such a card. The arms 61 rest upon arms 62 secured to a shaft 63, as best illustrated in Figs. 1, 4 and 7. Shaft 63 is provided with a depending operating arm 64 connected by means of a link 65 with a similar depending arm 66 on a shaft 67 located at the opposite end of the machine and carrying an oscillating stem 68 provided with a stop plate 69 adapted to oscillate upwardly between belts 52 and 53 and serve as a stop to interrupt the movement of a card traveling on said belts to position the same over table 32, as will be readily understood. Link 65 is given a slot and pin connection with the upper end of a lever 70 pivotally mounted in the frame at 71 and provided at its lower end with a cam roller 72 running upon the periphery of a cam 73 fixed to shaft 44, said roller being normally held in contact with said cam by the influence of a tension spring 70', as shown. By this arrangement, it will be observed that at each rotation of shaft 44, the roller 60 will be rocked downwardly into operative relation with belts 52 and 53 to facilitate the feeding of a card into the machine and the stop member 69 simultaneously rocked downwardly to permit the discharge of a card from the other end of the machine, stop member 69 returning to operative position, however, before the next succeeding card passes out of the machine.

A carriage 74 is mounted upon bearings 75 to reciprocate on brackets 76 arranged on the frame of the machine above table 32, as best illustrated in Figs. 1, 4 and 7. A gluing frame 77 is removably mounted in one end of carriage 74 and is provided with a plurality of depending gluing blocks 78 loosely mounted on the bottom of the frame 77 by means of screws 79, as best illustrated in Figs. 11, 15, 16 and 17. Under each of the screws 79 is arranged a leaf spring 80 normally pressing said gluing blocks 78 downwardly, the arrangement being such as to permit upward yielding and tilting of said blocks in any direction, thus effecting a universally yielding mounting therefor. Each of the blocks 78 is provided with a plurality of depending face blocks 81 having longitudinal recesses 81' in their lower or contacting faces. Stripper springs 82 are arranged between blocks 78, said stripper springs being secured to the under side of the frame 77 at one end and free at the other so as to permit ready yielding thereof, and said stripper springs are extended downwardly beyond the contact faces of blocks 81 to serve as means for freeing articles from adherence thereto.

As best shown in Fig. 2, a glue supplying vessel 83 is arranged at the side of the frame of the machine adjacent to the position of gluing frame 77 in such a position that said gluing frame will pass over said vessel 83 as carriage 74 reciprocates. The vessel 83 is provided with a glue applying roller 84 and with guard straps 85 passing over said roller in position to contact with springs 82 as the carriage reciprocates to prevent the application of glue to said springs. As best shown in Figs. 1 and 4, the roller 84 carries a small gear or pinion 86 at one end meshing with a rack bar 87 on the corresponding side of carriage 74, said rack bar serving to rotate the roller 84 to facilitate the application of glue. The arrangement is such that as carriage 74 reciprocates, it passes over roller 84 first in one direction and then another, the glue blocks 81 contacting with the periphery of said roller to receive a supply of glue therefrom, said glue passing largely into the recesses 81', as will be readily understood. The movements of table 32 and stop member 69 are so timed that during a pause in the reciprocation of carriage 74, a card will be elevated by said carriage into contact with the gluing faces of blocks 81, thus receiving a supply of glue contained in the recesses 81' therein.

Removably arranged at the other end of carriage 74 is a sample carrying frame 88, best shown in Figs. 1, 2, 12, 13 and 14. Plates 89 are arranged transversely across the bottom of the frame 88, being adjustably secured in said frame by means of bolts 90 and 90' taking through longitudinal slots provided therein. Each of the plates 89 is provided in its edges with notches 91 and a pair of oscillatory shafts 92 is mounted in suitable bearings 93 upon each of said plates. As best shown in Figs. 14, 18, 19, 20 and 21, each of the shafts 92 carries a depending needle carrying bar 94 secured thereto by means of hangers 95 and each of said bars is provided with a plurality of depending needles 96 having inwardly curved pointed ends 97 operating through the different notches 91 in the edges of the corresponding plate 89. One of each pair of shafts 92 carries at one end a larger segmental gear 98 meshing with a smaller segmental gear 99 on the companion shaft so as to cause movement of said shafts in unison with each other. The larger segmental gear 98 of each pair of shafts 92 meshes with a rack bar 100 mounted in suitable guides 100' on the corresponding side of frame 88. The rack bar 100 is given a slot and pin connection 101 with the upper end of an oscillating arm 102 fixed to a shaft 103 mounted in a side of frame 88 and carrying operating arms 104 and 105 fixed thereto, as best illustrated in Figs. 14 and 20. Each of the shafts 92 also carries a collar 106 having a notch 107 therein adapted to receive and engage the ends of a leaf spring 108 secured to the corresponding plate 89, as best shown in Fig. 19, and springs 109 are mounted upon each of said shafts having one end secured thereto and the other end to the corresponding plate 89 to exert tension on said shafts tending to rotate said needles in a direction upwardly and outwardly with respect to notches 91 and the bottoms of plates 89. By this arrangement it will be observed, that upon upward rocking of arm 104, the shafts 92 will be oscillated to cause downward and inward swinging of needles 97, causing said needles to penetrate and hold an article against the bottoms of plates 89, as will be readily understood.

As best shown in Figs. 2, 12 and 13, an adjustable sample holding frame 110 is mounted at the side of the frame of the machine adjacent the article carrying frame 88, and a plurality of supporting plates or tables 111 are arranged in frame 110 between the guides 112 and 113, said plates being arranged in transversely alining pairs to correspond and register with the plates 89 on the bottom of frame 88 at the end of the reciprocation of carriage 74 in one direction. Each of the plates 111 rests upon a head 114 carried by the upper end of a corresponding supporting rod 115 normally held in elevated position by means of a corresponding spring 116 resting upon a corresponding washer 117 supported by cross bars arranged at the bottom of frame 110. A pile of rectangular samples of cloth 118 is arranged upon each of the plates 111 with their side edges resting under stop bars 119 extending across the top of frame 110. As best shown in Fig. 24, the under side edges 120 of the stop bars 119 are outwardly and upwardly beveled and serrated to better perform this function. The frame 110 is provided at its side with detachable brackets 121 by means of which it is detachably secured to a bracket 122 secured to a vertically reciprocating frame 123 sliding upon guides 124 on frame 31, as best illustrated in Figs. 2, 4, 7, 9 and 12. At its lower end, frame 123 carries a cam roller 125 riding upon the periphery of a cam 126 secured to a shaft 127 driven by means of a bevel gear 128 meshing with a bevel gear 129 on shaft 44, as best illustrated in Figs. 4, 7 and 10. The arrangement is such, that as carriage 74 pauses in its reciprocations with the frame 88, positioned above frame 110, said frame 110 is caused to rise, thus bringing the uppermost sample of cloth, resting upon each of the plates 111, in contact with the bottom of the corresponding plate 89.

As best shown in Figs. 1 and 2, the frame 123 carries a push rod 130 adapted to contact with the arm 104 upon elevation of said frame so that upon such elevation of the frame 110, the needles 96 will be caused to penetrate the uppermost sample upon the corresponding pile of samples and hold the same tightly against the bottom of the corresponding plate 89, as indicated in dotted lines in Figs. 19 and 20, said samples being withdrawn from the frame 110 upon descent thereof, and being carried into the machine over table 32 upon the next movement of carriage 74. As best illustrated in Figs. 1 and 4, another push rod 131 is mounted to reciprocate vertically in frame 31, being connected at its lower end with one arm 132 of a bell crank lever, the other arm 133 of which is provided with a cam roller 134 riding upon the periphery of a cam 135 on shaft 44. The push rod 131 is so positioned and the cam 135 is so timed that during a pause of the carriage 74, with the frame 88 resting above table 32, the push rod 131 will be elevated into contact with arm 105 to disengage shafts 92 from springs 108, thus withdrawing needles 96 from the samples. The arrangement is also such, that at this time the samples carried by frame 88 will rest in registration with the glued portions of a card positioned over table 32 and the cam 43 is so timed as to cause another upward movement of said table coincident with the upward movement of push rod 131, so that as the glued portions of the card are applied to the under sides of the samples, said samples are released to return with said card.

As best shown in Figs. 1 and 3, the timed reciprocations of the carriage above mentioned are obtained through the medium of links 136 pivoted at 137 to the sides of said carriage and at 138 to the upper ends of levers 139 secured to a shaft 140. Shaft 140 is mounted in brackets 141 secured to the corresponding side of the machine frame 31 and carries a depending rocker arm 140' connected by means of a link 142 with a horizontally reciprocating frame 143, mounted to reciprocate horizontally in frame 131, as best indicated in Fig. 2. The frame 143 is provided with a vertical slot 144, and an arm 145 carrying a roller 146 operating in said slot is rigidly secured to shaft 127 to operate said frame, as best indicated in Figs. 2 and 10. This arrangement is such as to cause proper reciprocation and timing of the movements of carriage 74 to bring the gluing frame and the sample carrying frame alternately in operative position above table 32 and return said frames to coöperate respectively with the glue supplying roller 84 and the sample holding frame 110, as detailed above.

As best shown in Fig. 2, the vertically reciprocating rod 36 carrying the table 32, also carries laterally extending arms 147, having a shaft 148 loosely mounted at their outer ends. Shaft 148 carries an operating arm 149 resting upon a fulcrum 150 rigidly secured in frame 31, and a weight 151 is suspended from the inner end of arm 149 by means of a link 152. Shaft 148 also carries two upwardly extending positioning arms 153 having serrations 154 at their upper inner edges in position to coöperate with a Z-bar 155 positioned along the opposite edge of table 32. This arrangement is such that as table 32 rises, the arms 153 will be caused to rock inwardly and rise upwardly therewith to engage the corresponding edge of a card resting upon said table, forcing the opposite edge of said card under the lip of the Z-bar 155, thus accurately positioning said card and securely holding the same so as to free the same from adherence to the glue blocks 78, a result which is facilitated by means of the springs 82. As best shown in Figs. 1, 4 and 12, two supporting arms 156 are arranged at the discharge end of the machine to temporarily receive and support a card discharged by belts 52 and 53 over roller 57, said arms may be provided at their outer ends with upstanding stop fingers 157 adapted to limit the outward movement of said cards. The arms 156 are carried by two upstanding arms 158 secured at their lower ends to shafts 159, as best shown in Fig. 2. Shafts 159 are operatively connected by means of arms 160 and 161 fixed thereto and connected centrally by means of a slot and pin connection 162. One of the shafts 159 carries an operating arm 163 connected by means of a link 164 with the lower end of a lever 165 pivoted at 166 in frame 31 and carrying a cam roller 167 running upon the periphery of a cam 168 mounted on shaft 127. A tension spring 169 is connected with arm 163 and serves to hold roller 167 in constant contact with the periphery of cam 168, buffers 158' being also provided for limiting the outward swing of arms 158, as best shown in Figs. 2 and 7. The arrangement is such that as each card is delivered from the belts 52 and 53, the arms 156 are drawn together to receive and temporarily support said card. Then said arms separate permitting the card to fall onto a truck or other suitable support. The operation of the machine is controlled by means of a hand lever 170 pivotally mounted at 171 and operatively connected with one arm 172 of a bell crank lever, as best illustrated in Figs. 4 and 10. The other arm 173 of said bell crank carries a fork 174 running in a groove 175 in the hub of a friction clutch member 176 splined on shaft 50 and coöperating with a clutch member 177 fixed to a pinion 49. By this arrangement, it will be observed that, by manipulating hand lever 170, the clutch member 176 may be thrown into and out of engagement with clutch member 177, thus stopping and starting the machine at the will of the operator.

The construction above described has been found to be adequate and efficient in handling samples of considerable and uniform size, but we have experienced some difficulty in handling samples of small and various sizes therewith. To obviate this difficulty, we remove some of the plates 89 from the sample carrying frame 88 and substitute therefor cross bars 178 adjustably secured in said frame by means of bolts 179, as best illustrated in Figs. 25 to 29, inclusive. Each of the cross bars 178 is provided with a plurality of threaded openings 180 and hollow posts 181 are mounted in said openings and locked in position therein by means of lock nuts 182, two of said hollow posts 181 and accompanying parts being provided for each small sample to be handled. Each of the posts 181 has a vertically reciprocatory rotatable stem 183 mounted therein and provided at its lower end with a head 184 projecting slightly below the bottom of the corresponding bar 178. Each of the heads 184 is provided with a penetrating needle 185 projecting therefrom at its base in a substantially tangential direction and preferably curved with the axis of stem 183 as a center, as best illustrated in Figs. 28 and 29. Each of the stems 183 is provided at its upper end with a grooved pulley 186 and a spring 187 is imprisoned in each of the posts 181, as shown, said spring serving to yieldingly press the corresponding head 184 and needle 185 downwardly, and the pulley 186 serving as a collar to limit such downward movement. A drum 188 is rotatably mounted on carriage 74 and a flexible cord or other element 189 is wound once around each of the pulleys 186 on one of the bars 178, and has its ends wound upon and secured to drum 188 by means of a screw 190, each of said cords 189 being also passed over an idler pulley 191 on a post 192, as indicated. The drum 188 carries an operating pinion 193 meshing with pinions 194 and 195 mounted on frame 74. Pinions 194 and 195 carry eccentric rollers 196 and 197 projecting from their inner faces, and a push rod 198 is mounted on the upper end of frame 123 in position to contact with and operate roller 197 upon elevation of said frame, as best illustrated in Figs. 7 and 26. Another push rod 199, as best shown in Fig. 4, is operatively connected with lever arm 132 in position to contact with roller 196 when the frame 74 is positioned over table 32. The arrangement is such that at each elevation of the sample holder frame 110, as detailed above, the corresponding samples will be brought into contact with the corresponding heads 184 and drum 188 rotated to cause rotation of the corresponding needles 185 which will thus be caused to penetrate the sample and engage and hold the same. Likewise, when the sample carrying frame 174 is positioned over table 32, the push rod 199 will contact with roller 196 and oscillate drum 188 to cause reverse rotation of the needles 185 to release said samples for removal with a glued card, as will be readily understood.

In Fig. 30 we have illustrated a sample card 200 provided with larger samples 201 and smaller samples 202, this being the form of card adapted to be mounted with samples for the positions of the parts illustrated in Fig. 25. For other arrangements of samples the different parts may be adjusted as desired, and as will be readily understood.

While we have illustrated and described the preferred forms of construction for carrying our invention into effect, these are capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. A machine of the class described comprising gluing means; sample carrying means; card carrying means; and means for operating said card carrying means to apply a card in the same to said gluing means and to a sample in said sample carrying means, substantially as described.

2. A machine of the class described comprising gluing means; sample carrying means; card carrying means; and means for operating said card carrying means to apply a card in the same alternately to said gluing means and to a sample in said sample carrying means, substantially as described.

3. A machine of the class described comprising a reciprocating carriage; gluing and sample carrying means on said carriage; card carrying means coöperating with said carriage; and means for operating said card carrying means to apply a card in the same to said gluing means and to a sample in said sample carrying means, substantially as described.

4. A machine of the class described comprising a reciprocating carriage; gluing and sample carrying means on said carriage; card carrying means coöperating with said carriage; and means for operating said card carrying means to apply a card in the same alternately to said gluing means and to a sample in said sample carrying means, substantially as described.

5. A machine of the class described comprising a frame; means for feeding cards through said frame in one direction; a carriage reciprocating in said frame across the path of said cards; card gluing means on said carriage; sample carrying means on said carriage; means for supplying samples to said carrying means; means for applying said gluing means to said cards; and means for applying said samples to said glued cards and releasing said samples, substantially as described.

6. A machine of the class described comprising a frame; means for feeding cards through said frame in one direction; means for interrupting the feed of said cards; a carriage reciprocating in said frame across said interrupted cards; card gluing means on said carriage; sample carrying means on said carriage; means for supplying samples to said carrying means; means for applying said gluing means to said cards; and means for applying said samples to said glued cards and releasing said samples, substantially as described.

7. A machine of the class described comprising a frame; means for feeding cards through said frame in one direction; a carriage reciprocating in said frame across and above the path of said cards; card gluing means on said carriage; sample carrying means on said carriage; means for supplying samples to said carrying means; means for applying said gluing means to said cards; and means for applying said samples to said glued cards and releasing said samples, substantially as described.

8. A machine of the class described comprising a frame; means for feeding cards through said frame in one direction; a carriage reciprocating in said frame across and above said interrupted cards; card gluing means on said carriage; sample carrying means on said carriage; means for supplying samples to said carrying means; means for applying said gluing means to said cards; and means for applying said samples to said glued cards and releasing said samples, substantially as described.

9. A machine of the class described comprising a reciprocating carriage; gluing means at one end of said carriage; sample carrying and releasing means at the other end of said carriage; and means for applying cards alternately to said gluing means and said sample carrying and releasing means, substantially as described.

10. A machine of the class described comprising a reciprocating carriage; gluing means at one end of the under side of said carriage; sample carrying and releasing means at the other end of the under side of said carriage; and means for applying cards alternately to said gluing means and said sample carrying and releasing means, substantially as described.

11. A machine of the class described comprising a frame; a vertically reciprocating table in said frame; means for supplying cards to said table; gluing means arranged to move into and out of operative relation above said table; and sample carrying and releasing means arranged to move into and out of operative relation above said table alternately with said gluing means, substantially as described.

12. A machine of the class described comprising a frame; a vertically reciprocating table in said frame; means for supplying cards to said table; and a reciprocating carriage carrying gluing means arranged to move into and out of operative relation above said table and sample carrying and releasing means arranged to move into and out of operative relation above said table alternately with said gluing means, substantially as described.

13. A machine of the class described comprising a frame; a vertically reciprocating table in said frame; card carrying belts traveling across said table; gluing means arranged to move into and out of operative relation above said table; and sample carrying and releasing means arranged to move into and out of operative relation above said table alternately with said gluing means, substantially as described.

14. A machine of the class described comprising a frame; a vertically reciprocating table in said frame; card carrying belts traveling across said table; and a reciprocating carriage carrying gluing means arranged to move into and out of operative relation above said table and sample carrying and releasing means arranged to move into and out of operative relation above said table alternately with said gluing means, substantially as described.

15. A machine of the class described comprising a frame; a vertically reciprocating table in said frame; card carrying belts traveling across said table; means for temporarily stopping cards on said belts above said table; gluing means arranged to move into and out of operative relation above said table; and sample carrying and releasing means arranged to move into and out of operative relation above said table alternately with said gluing means, substantially as described.

16. A machine of the class described comprising a frame; a vertically reciprocating table in said frame; card carrying belts traveling across said table; means for temporarily stopping cards on said belts above said table; and a reciprocating carriage carrying gluing means arranged to move into and out of operative relation above said table and sample carrying and releasing means arranged to move into and out of operative relation above said table alternately with said gluing means, substantially as described.

17. A machine of the class described comprising a frame; a vertically reciprocating table in said frame; means for supplying cards to said table; automatic means arranged to engage and hold each of said cards upon each elevation of said table; gluing means arranged to move into and out of operative relation above said table; and sample carrying and releasing means arranged to move into and out of operative relation above said table alternately with said gluing means, substantially as described.

18. A machine of the class described comprising a frame; a vertically reciprocating table in said frame; means for supplying cards to said table; automatic means arranged to engage and hold each of said cards upon each elevation of said table; and a reciprocating carriage carrying gluing means arranged to move into and out of operative relation with said table and sample carrying and releasing means arranged to move into and out of operative relation above said table alternately with said gluing means, substantially as described.

19. A machine of the class described comprising a frame; a vertically reciprocating table in said frame; card carrying belts traveling across said table; automatic means arranged to engage and hold each of said cards upon each elevation of said table; gluing means arranged to move into and out of operative relation above said table; and sample carrying and releasing means arranged to move into and out of operative relation above said table alternately with said gluing means, substantially as described.

20. A machine of the class described comprising a frame; a vertically reciprocating table in said frame; card carrying belts traveling across said table; means for temporarily stopping cards on said belts above said table; automatic means arranged to engage and hold each of said cards upon each elevation of said table; gluing means arranged to move into and out of operative relation above said table; and sample carrying and releasing means arranged to move into and out of operative relation above said table alternately with said gluing means, substantially as described.

21. A machine of the class described comprising a frame; a vertically reciprocating table in said frame; card carrying belts traveling across said table; means for temporarily stopping cards on said belts above said table; automatic means arranged to engage and hold each of said cards upon each elevation of said table; and a reciprocating carriage carrying gluing means arranged to move into and out of operative relation above said table and sample carrying and releasing means arranged to move into and out of operative relation above said table alternately with said gluing means, substantially as described.

22. A machine of the class described comprising a frame; a vertically reciprocating table in said frame; card carrying belts traveling across said table; means for temporarily stopping cards on said belts above said table; gluing means arranged to move into and out of operative relation above said table; sample carrying and releasing means arranged to move into and out of operative relation above said table alternately with said gluing means; supporting arms arranged to receive and support cards discharged by said belts; and means for separating said arms to discharge said cards, substantially as described.

23. A machine of the class described comprising a frame; a vertically reciprocating table in said frame; card carrying belts traveling across said table; means for temporarily stopping cards on said belts above said table; a reciprocating carriage carrying gluing means arranged to move into and out of operative relation above said table and sample carrying and releasing means arranged to move into and out of operative relation above said table alternately with said gluing means; supporting arms arranged to receive and support cards discharged by said belts; and means for separating said arms to discharge said cards, substantially as described.

24. A machine of the class described comprising a frame; a vertically reciprocating table in said frame; card carrying belts traveling across said table; means for temporarily stopping cards on said belts above said table; automatic means arranged to engage and hold each of said cards upon each elevation of said table; a reciprocating carriage carrying gluing means arranged to move into and out of operative relation above said table and sample carrying and releasing means arranged to move into and out of operative relation above said table alternately with said gluing means; supporting arms arranged to receive and support cards discharged by said belts; and means for separating said arms to discharge said cards, substantially as described.

25. A machine of the class described comprising a frame; a vertically reciprocating table in said frame; card carrying belts traveling across said table; an intermittent stop arranged to position cards on said belts over said table; glue supplying means at one side of said table; a sample holder at the other side of said table; a carriage reciprocating across said table over said gluing means and sample holder; glue applying means at the corresponding end of the under side of said carriage and coöperating with said glue supplying means and said table to apply glue to cards on the latter; and sample carrying and releasing means at the other end of the under side of said carriage and coöperating with said sample holder and said table to apply samples to said cards, substantially as described.

26. A machine of the class described comprising a frame; a vertically reciprocating table in said frame; automatic means arranged to engage and hold a card thereon upon elevation thereof; card carrying belts traveling across said table; an intermittent stop arranged to position cards on said belts over said table; glue supplying means at one side of said table; a sample holder at the other side of said table; a carriage reciprocating across said table over said gluing means and sample holder; glue applying means at the corresponding end of the under side of said carriage and coöperating with said glue supplying means and said table to apply glue to cards on the latter; and sample carrying and releasing means at the other end of the under side of said carriage and coöperating with said sample holder and said table to apply samples to said cards, substantially as described.

27. A machine of the class described comprising a frame; a vertically reciprocating table in said frame; card carrying belts traveling across said table; an intermittent stop arranged to position cards on said belts over said table; glue supplying means at one side of said table; a vertically reciprocating sample holder arranged to permit removal of samples from the top thereof; a carriage reciprocating across said table over said gluing means and sample holder; glue applying means at the corresponding end of the under side of said carriage and coöperating with said glue supplying means and said table to apply glue to cards on the latter; and sample carrying and releasing means at the other end of the underside of said carriage and coöperating with said sample holder and said table to apply samples to said cards, substantially as described.

28. A machine of the class described comprising a frame; a vertically reciprocating table in said frame; card carrying belts traveling across said table; an intermittent stop arranged to position cards on said belts over said table; glue supplying means at one side of said table; a vertically reciprocating sample holder arranged to permit removal of samples from the top thereof; stops at the top thereof for temporarily holding samples therein; a spring yieldingly pressing said samples upwardly against said stops; a carriage reciprocating across said table over said gluing means and sample holder; glue applying means at the corresponding end of the under side of said carriage and coöperating with said glue supplying means and said table to apply glue to cards on the latter; and sample carrying and releasing means at the other end of the under side of said carriage and coöperating with said sample holder and said table to apply samples to said cards, substantially as described.

29. A machine of the class described comprising a frame; a vertically reciprocating table in said frame; card carrying belts traveling across said table; an intermittent stop arranged to position cards on said belts over said table; glue supplying means at one side of said table; a sample holder at the other side of said table; a carriage reciprocating across said table over said gluing means and sample holder; a gluing frame at the corresponding end of the under side of said carriage; a plurality of glue applying blocks on said frame having recesses in their faces; and sample carrying and releasing means at the other end of the under side of said carriage and coöperating with said sample holder and said table to apply samples to said cards, substantially as described.

30. A machine of the class described comprising a frame; a vertically reciprocating table in said frame; card carrying belts traveling across said table; an intermittent stop arranged to position cards on said belts over said table; glue supplying means at one side of said table; a sample holder at the other side of said table; a carriage reciprocating across said table over said gluing means and sample holder; a gluing frame at the corresponding end of the under side of said carriage; a plurality of universally yieldable glue applying blocks on said frame having recesses in their faces; and sample carrying and releasing means at the other end of the under side of said carriage and coöperating with said sample holder and said table to apply samples to said cards, substantially as described.

31. A machine of the class described comprising a frame; a vertically reciprocating table in said frame; card carrying belts traveling across said table; an intermittent stop arranged to position cards on said belts over said table; glue supplying means at one side of said table; a sample holder at the other side of said table; a carriage reciprocating across said table over said gluing means and sample holder; a gluing frame at the corresponding end of the under side of said carriage; a plurality of universally yieldable glue applying blocks on said frame; and sample carrying and releasing means at the other end of the under side of said carriage and coöperating with said sample holder and said table to apply samples to said cards, substantially as described.

32. A machine of the class described comprising a frame; a vertically reciprocating table in said frame; card carrying belts traveling across said table; an intermittent stop arranged to position cards on said belts over said table; glue supplying means at one side of said table; a sample holder at the other side of said table; a carriage reciprocating across said table over said gluing means and sample holder; a gluing frame at the corresponding end of the under side of said carriage; a plurality of glue applying blocks on said frame having recesses in their faces; sample carrying and releasing means at the other end of the under side of said carriage and coöperating with said sample holder and said table to apply samples to said cards; and stripper members arranged between said blocks and adapted to free a card therefrom, substantially as described.

33. A machine of the class described comprising a frame; a vertically reciprocating table in said frame; card carrying belts traveling across said table; an intermittent stop arranged to position cards on said belts over said table; glue supplying means at one side of said table; a vertically reciprocating sample holder at the other side of said table; a carriage reciprocating across said table over said gluing means and sample holder; glue applying means at the corresponding end of the under side of said carriage and coöperating with said glue supplying means and said table to apply glue to cards on the latter; a sample carrying and releasing frame at the other end of the under side of said carriage; a plurality of notched plates on said carrying and releasing frame; two parallel shafts on each of said plates; hook-like needles on said shafts operating through said notches; intermeshing segmental gears on said shafts; a rack bar meshing with one gear of each set; means on said sample holder effecting movement of said rack to operate said needles; and means for effecting return movement of said rack bar to release said samples when said table is elevated to apply a glued card thereto, substantially as described.

34. A machine of the class described comprising a frame; a vertically reciprocating table in said frame; card carrying belts traveling across said table; an intermittent stop arranged to position cards on said belt over said table; glue supplying means at one side of said table; a vertically reciprocating sample holder at the other side of said table; a carriage reciprocating across said table over said gluing means and sample holder; glue applying means at the corresponding end of the under side of said carriage and coöperating with said glue supplying means and said table to apply glue to cards on the latter; a sample carrying and releasing frame at the other end of the under side of said carriage; a plurality of plates on said carrying and releasing frame and having threaded openings therein; hollow posts threaded in said openings; rotatable and reciprocatory stems mounted in said posts; a curved needle extending substantially tangentially from the lower end of each of said stems; a grooved pulley on the other end of each of said stems; an oscillatory drum; a flexible element wound upon each pulley upon each plate and having its ends wound upon said drum; means on said sample holder for effecting oscillation of said drum to operate said needle; and means for effecting oscillation of said drum to release said samples when said table is elevated to apply a glued card thereto, substantially as described.

35. A machine of the class described comprising a frame; a vertically reciprocating table in said frame; card carrying belts traveling across said table; an intermittent stop arranged to position cards on said belts over said table; glue supplying means at one side of said table; a vertically reciprocating sample holder at the other side of said table; a carriage reciprocating across said table over said gluing means and sample holder; glue applying means at the corresponding end of the under side of said carriage and coöperating with said glue supplying means and said table to apply glue to the cards on the latter; a sample carrying and releasing frame at the other end of the under side of said carriage; a plurality of notched plates on said carrying and releasing frame; two parallel shafts on each of said plates; hook-like needles on said shafts operating through said notches; intermeshing segmental gears on said shafts; a rack bar meshing with one gear of each set; means on said sample holder effecting movement of said rack to operate said needles; means for effecting return movement of said rack bar to release said samples when said table is elevated to apply a glued card thereto; a plurality of plates on said carrying and releasing frame and having threaded openings therein; hollow posts threaded in said openings; rotatable and reciprocatory stems threaded in said posts; a curved needle extending substantially tangentially from the lower end of each of said stems; a grooved pulley on the other end of each of said stems; an oscillatory drum; a flexible element wound upon each pulley upon each plate and having its ends wound upon said drum; means on said sample holder for effecting oscillation of said drum to operate said needles; and means for effecting oscillation of said drum to release the samples controlled thereby when said table is elevated to apply a glued card thereto, substantially as described.

36. A machine of the class described comprising a frame; a vertically reciprocating table in said frame; automatic means arranged to engage and hold a card thereon upon elevation thereof; card carrying belts traveling across said table; an intermittent stop arranged to position cards on said belts over said table; glue supplying means at one side of said table; a vertically reciprocating sample holder at the other side of said table; a carriage reciprocating across said table over said gluing means and sample holder; glue applying means at the corresponding end of the underside of said carriage; a plurality of universally yieldable glue applying blocks on said frame having recesses in their faces; a sample carrying and releasing frame at the other end of the under side of said carriage; a plurality of notched plates on said carrying and releasing frame; two parallel shafts on each of said plates; hook-like needles on said shafts operating through said notches; intermeshing segmental gears on said shafts; a rack bar meshing with one gear of each set; means on said sample holder effecting movement of said rack to operate said needles; means for effecting return movement of said rack bar to release said samples when said table is elevated to apply a glued card thereto; a plurality of plates on said carrying and releasing frame and having threaded openings therein; hollow posts threaded in said openings; rotatable and reciprocatory stems mounted in said posts; a curved needle extending substantially tangentially from the lower end of each of said stems; a grooved pulley on the other end of each of said stems; an oscillatory drum; a flexible element wound upon each pulley upon each plate and having its ends wound upon said drum; means on said sample holder for effecting oscillation of said drum to operate said needles; and means for effecting oscillation of said drum to release the samples controlled thereby when said table is elevated to apply a glued card thereto, substantially as described.

In testimony whereof we have signed our names to this specification in the presence of two subscribing witnesses.

JOHN FREDRICKSON.
FRED A. RISBERG.

Witnesses:
JOSHUA R. H. POTTS,
B. G. RICHARDS.

Copies of this patent may be obtained for five cents each, by addressing the "Commissioner of Patents, Washington, D. C."